United States Patent [19]

Morrison

[11] 4,045,774
[45] Aug. 30, 1977

[54] MODEM SHARER

[75] Inventor: Guy E. Morrison, Columbia, Mo.

[73] Assignee: Skei Corporation, Columbia, Mo.

[21] Appl. No.: 724,613

[22] Filed: Sept. 20, 1976

[51] Int. Cl.² .................... H04B 1/38; H04Q 5/00; G06F 3/00
[52] U.S. Cl. .................... 340/147 LP; 364/900
[58] Field of Search .................... 177/2 C, 2 DP; 340/147 C, 147 CN, 147 CV, 147 LP, 152 T

[56] References Cited
U.S. PATENT DOCUMENTS

| | | | |
|---|---|---|---|
| 3,609,693 | 9/1971 | Ferroglio | 340/152 |
| 3,772,656 | 11/1973 | Serracchioli et al. | 340/172.5 |

Primary Examiner—George G. Stellar
Attorney, Agent, or Firm—Fleit & Jacobson

[57] ABSTRACT

A modem sharer for interconnecting a plurality of remote terminals with a modem for the transmission of data between the terminals and the modem. The modem sharer includes a request to send circuit having a timer, a data transmission gating circuit, and a clear to send circuit. The raising of a request to send signal at a selected terminal actuates the timer and initiates signal transmission if cleared for transmission. Transmission is interrupted if not completed within a preset time set into the timer. Then, remaining terminals are free to transmit. LED displays indicate modem sharer operation, including an offending terminal which is not transmitting properly. The modem sharer is short circuit protected, and is capable of operating in a piggyback array.

13 Claims, 6 Drawing Figures

MODEM SHARER

BACKGROUND OF THE INVENTION

In what is referred to as a "teleprocessing" operation, a computer is attached to another device, either another computer or a remote terminal, for the transmission of data therebetween. The line interconnecting a computer or remote terminal may be a telephone network, leased lines or the like, and the common practice is to utilize a modem at each location in the transmission network.

In one such teleprocessing operation, an operator at a remote terminal who has data to transmit, generates such data through the remote terminal for transmission to the computer, one character at a time, in what is referred to as a "conversational mode", usually on a key stroke basis. In such a "conversational mode", the operator at the remote terminal begins generating and sending data to the computer, one character at a time, and it is up to the computer program to sense that this data has arrived, interrupt the program that it is performing, and process the data, one character at a time.

In the more widely used type of teleprocessing operation, what is referred to as "polled network", the operator first composes a complete message for the computer. During the time the operator is composing the message, the computer to which the message is to be sent is processing its regular program, but it stops occasionally and sequentially addresses all of the remote terminals to which it is connected to determine if any of the remote terminals has data which is to be sent. If a remote terminal has a message ready for transmission, the operator depresses a transmit key and the next time the computer polls the network, the prepared data will automatically be sent to the computer. It is this type of "polled network" that the modem sharer of the invention is directed, as most large commercial teleprocessing operations incorporate the polling network technique because of its tremendous advantage over the "conversational mode" in line utilization and computer efficiency.

When a computer or terminal is connected to a modem, which permits it to transmit data over a telephone line, there are specific control leads connected between the modem and the terminal or computer for indicating overall system status. Also connected between the modem and terminal or computer are other leads which are used for protocol between the two units. Such control and other leads include a request to send (RTS) lead through which a local terminal may indicate that data is to be transmitted, a clear to send (CTS) lead by which means the terminal is signalled when the modem is ready to accept data after a RTS signal has been received, a transmitted data lead (TX) for data to be transmitted from the local device to a distant terminal, the local terminal using a transmitted clock (TC) signal to time such data transmission and a received data (RX) lead which contains the data being received by the modem from a distant device for the terminal or computer of the modem, the data on the receive data lead being timed by the receive clock (RC) at the local terminal.

When a plurality of remote terminals are incorporated in a teleprocessing network, one known technique is to associate a modem with each of the terminals and the transmission line, with a modem associated with the computer at the other end of the transmission line. To eliminate the requirement of a modem for each of the remote terminals, one known system incorporates a multiplexer to which all of the remote terminals are connected, the multiplexer being connected in turn to a single modem which is connected over the transmission line to a modem associated with the computer. In a more recently developed system, avoiding certain disadvantages common to the multiplexer arrangement, such as the elimination of multiplexers at both ends of the transmission line, a modem sharer is substituted for one multiplexer. A plurality of terminals are connected to the modem sharer, connected in turn to a modem, the transmission line, another modem and then the computer.

Many such modem sharers are commercially available today, but they are generally characterized by certain disadvantages. For instance, such present day modem sharers are generally subject to short circuits, bringing about defective operation within the various leads in the system, with attendant difficulty in identifying the source of the trouble. In addition, modern day modem sharers do not provide any timing sequence to protect against remote terminals which transmit or lock-up for excessive time periods. Also, such present day modem sharers are limited in the number of remote terminals which they are able to service, imposing a limitation on the versility of such modem sharers.

SUMMARY OF THE INVENTION

Accordingly, a primary object of this invention is to provide a new modem sharer for use in a teleprocessing operation.

Another object of this invention is to provide a new modem sharer which may be used in a teleprocessing system to permit the utilization of a substantial number of remote terminals in the system.

Still another object of this invention, is to provide a new modem sharer for a teleprocessing system wherein the transmission of data between remote terminals and a local terminal is performed with a minimum of interference between the terminals, and in the most efficient manner.

A still further object of this invention is to provide a new modem sharer for a teleprocessing system in which short circuits in the leads in the system are quickly identified, and in which the remote terminals continue to operate without interference from such short circuits.

This invention further relates to the provision of a new modem sharer which permits the regeneration of received data, clear to send, transmit clock and receive clock data as well as the regenerating of request to send and transmit data signals from remote terminals to the modem, thereby allowing such modem sharers to be piggybacked and thereby increase the number of terminals the modem sharer can service.

Still another object of this invention is to provide a new modem sharer in which request to send signals from each terminal are timed to an extent which permits maximum utilization of the other terminals in the system.

These objects and other related objects will become more readily apparent when reference is made to the following description taken in conjunction with the accompanying drawings.

DETAILED DESCRIPTION OF THE INVENTION

Figure 1:
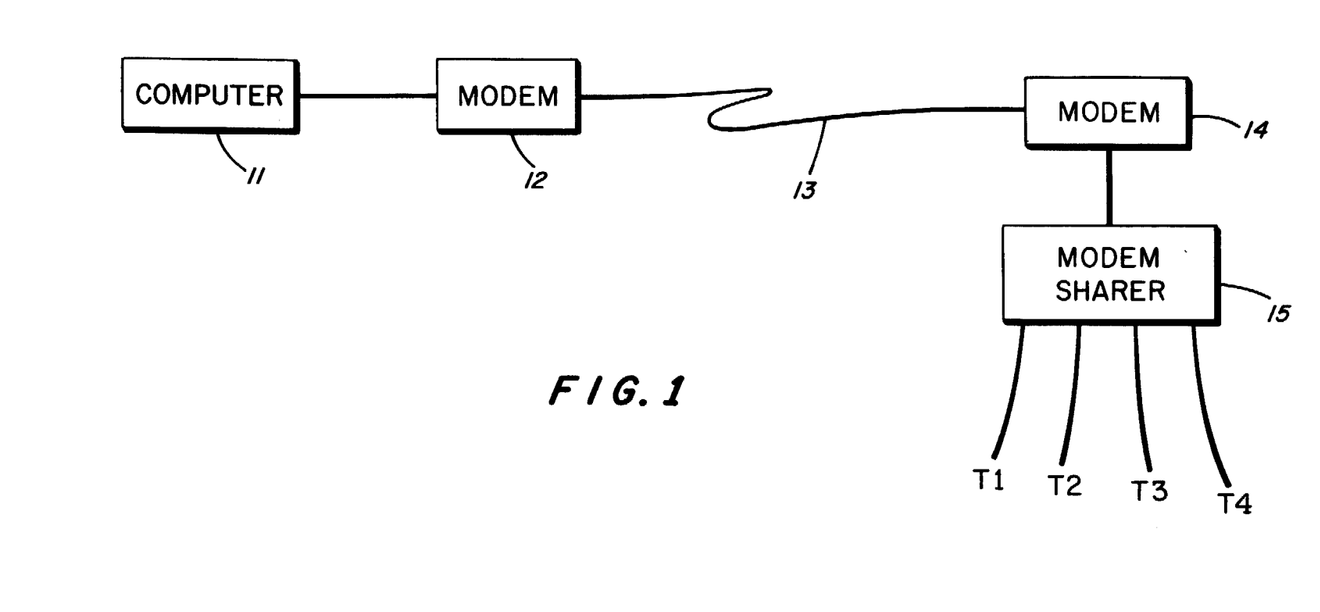
FIG. 1 is a schematic diagram of a teleprocessing system incorporating the modem sharer of the invention.

Referring now to the drawings, and to FIG. 1 in particular, there is shown schematically a typical teleprocessing system incorporating the modem sharer of the invention which includes a computer 11 and associated modem 12 interconnected in a polled network by means such as a telephone network or a leased line 13 to a modem 14 to which the modem sharer 15 of the invention is connected, the computer 11 and the modems 12 and 13 being of any suitable conventional construction. The modem sharer 15 is arranged to be connected to a plurality of remote terminals which in the illustrated embodiment are four in number, the remote terminals being identified by the reference numerals T1–T4.

In the following paragraphs, reference is made to specific commercially available integrated circuits, using the industry-wide identification codes. The commercial "7400 Series" identification is used, rather than the "JAN 5400 Series".

Figure 2:
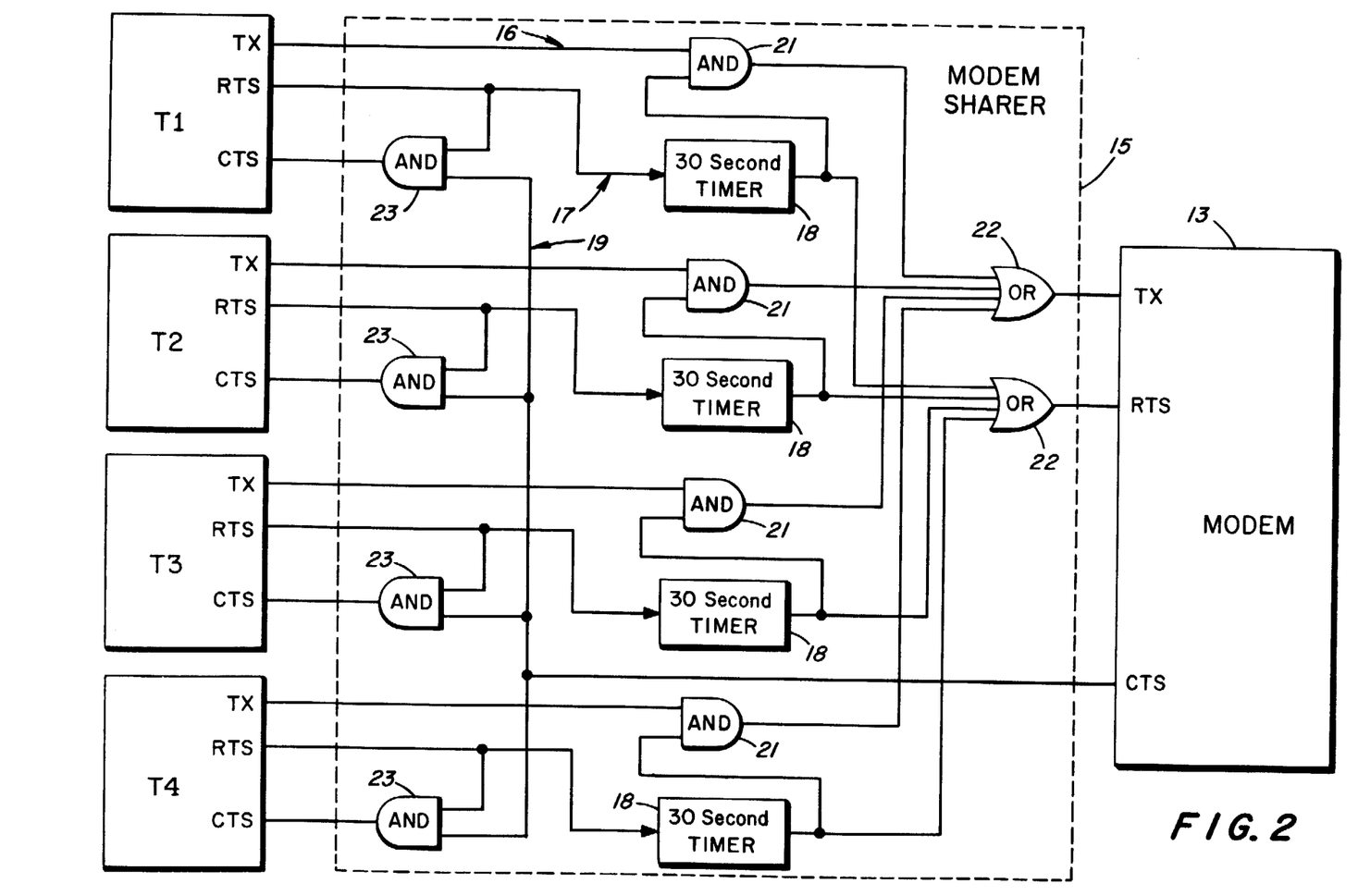
FIG. 2 is a simplified schematic wiring diagram of the modem sharer of the invention, together with the remote terminals and modem.

Referring now to FIG. 2, there is shown a simplified block diagram which includes the four remote terminals T1–T4, the modem 13 and the modem sharer 15 enclosed within the broken lines. Each of the terminals is provided with a transmitted data (TX) lead, a request to send (RTS) lead, and a clear to send (CTS) lead. Corresponding leads are provided in the modem 13, similarly identified.

The modem sharer 15 includes a plurality of circuits as will be explained in more detail hereinafter, which are interconnected both to each other and to the aforementioned leads on the terminals T1–T4 and the modem 13. Such circuits include a transmit data circuit designated generally by numeral 16, a request to send circuit designated generally by the numeral 17 and which includes a timer 18, and a clear to send circuit designated generally by the numeral 19. The circuits associated with each of the terminals T1–T4 are identified by the same reference numerals. The transmitted data circuit 16 includes an AND gate 21, the output of which is connected to an OR gate 22, two of such OR gates 22 being provided which are connected to the respective transmitted data and request to send leads of the modem 13. In the clear to send circuit, the clear to send lead on each of the terminals T1–T4 is connected to an AND gate 23 as shown.

When a polled terminal is ready to transmit data, it will raise (issue a positive-going signal) its RTS lead. The signal will initiate the action of an associated timer 18 which, in turn, will send signals to AND gate 21 in the transmit circuit and to the RTS lead of modem 13 through OR gate 22. Receipt of a signal at its RTS lead causes modem 13 to issue a signal at its CTS output. This CTS signal reaches the terminal through AND gate 23, the other input of which is the RTS signal described above. With data to be transmitted, signals from the TX lead of the terminal feed the remaining input to AND gate 21, turning the gate on, and transmitting data to the TX lead of modem 13 through OR gate 22.

Should the terminal not complete transmission within the allotted time, say 30 seconds, timer 18 terminates its output, and hence ceases the transmission of signals to OR gate 22 and AND gate 21. Accordingly, the transmission of data to the TX input of the modem 13 is blocked, and the RTS signal to modem 13 is discontinued.

Figure 3A:
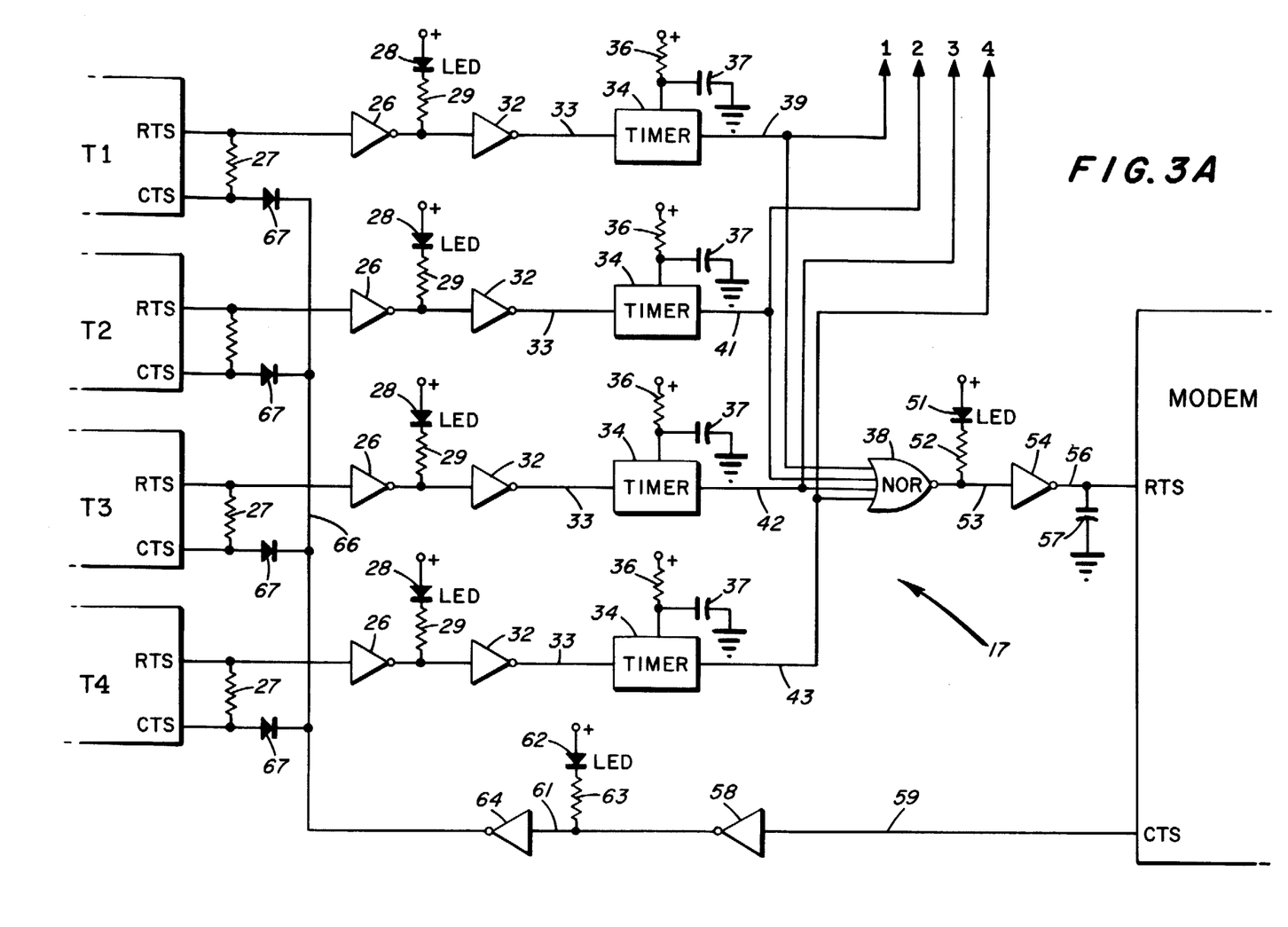
FIGS. 3a, 3b and 3c are schematic wiring diagrams of modem sharer circuits constructed in accordance with the invention.
Figure 3B:
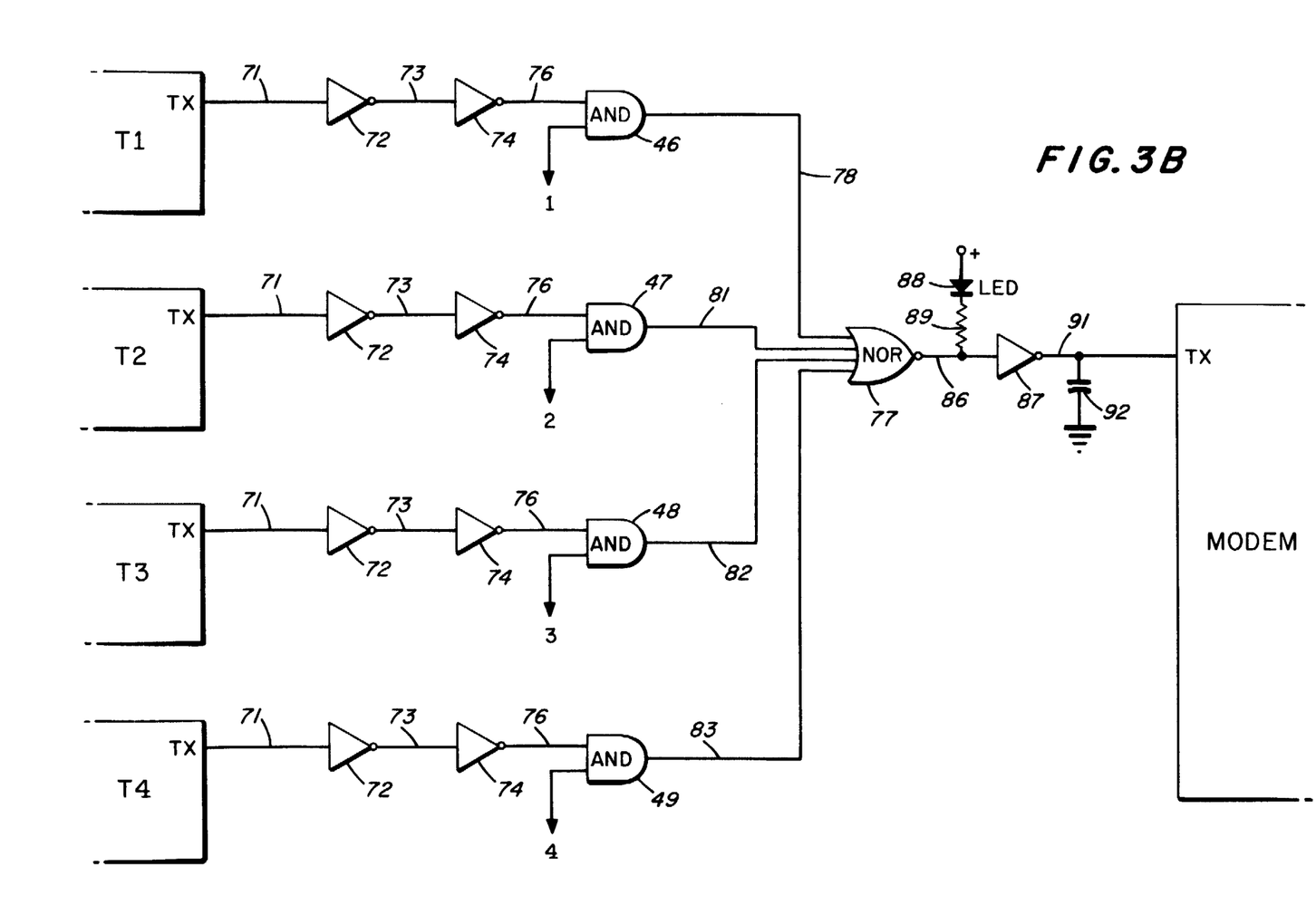
Figure 3C:
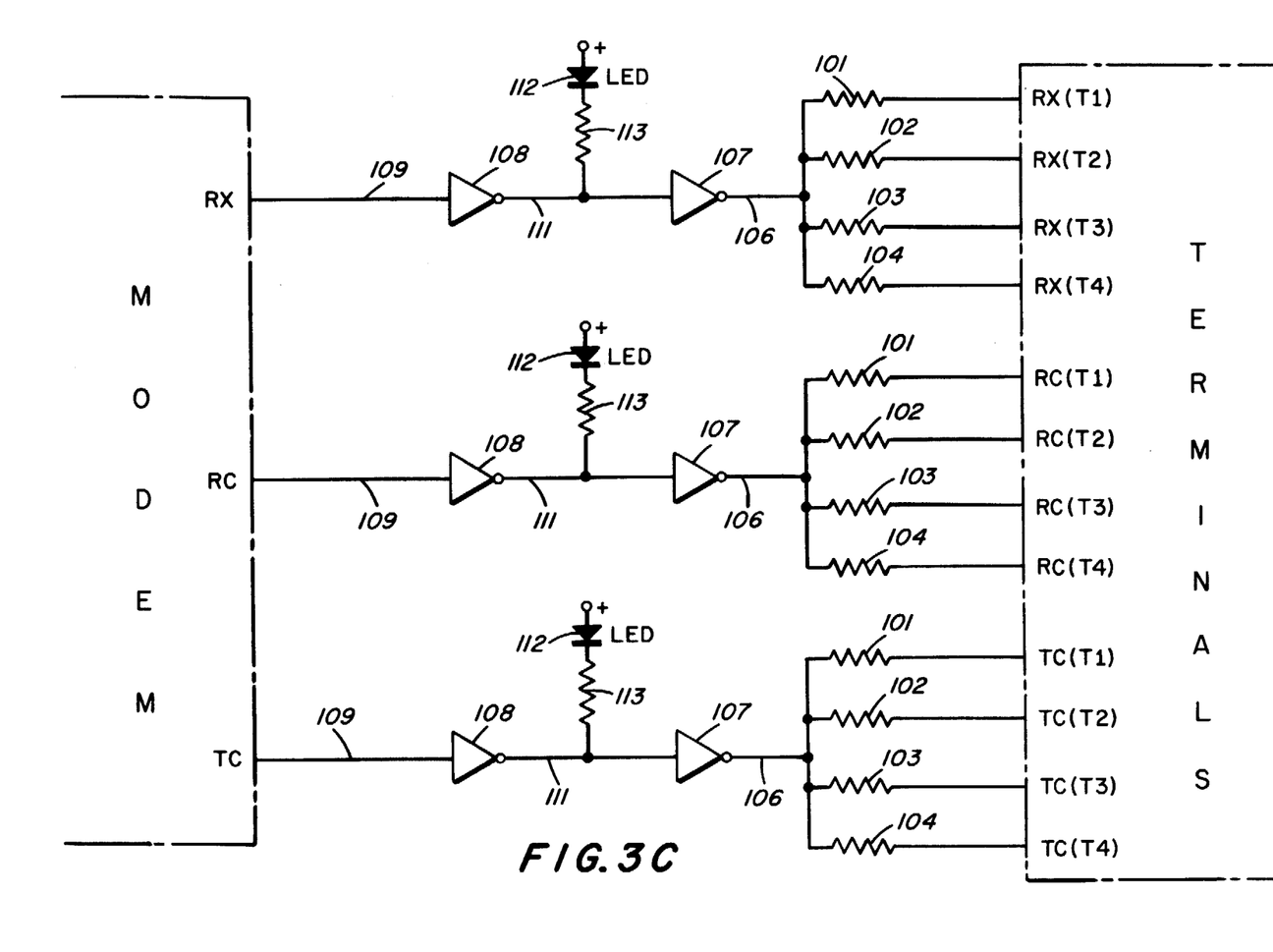

Referring now to FIG. 3, it should be recalled that the modem sharer circuit shown therein utilizes standard TTL (transistor-transistor) logic circuits available commercially. The complete modem sharer circuit may, on the other hand, be designed to utilize a single custom LSI integrated circuit or discrete components. In FIG. 3, the request to send circuit 17 is actuated when the selected terminal is addressed or polled and if such selected terminal has a message to send, it will raise its RTS lead. This signal is fed to the input of a line receiver circuit 26 (SN75154) which converts RS 232 (industry standard) bi-polar signals of ± 25V to TTL levels of 0–5V. The input of the line receiver 26 is connected by means of a resistor 27 to the associated CTS lead of the terminal T1 which, in the description to follow, is the terminal having a message to send, such operations being duplicated on terminals T2–T4. The output of the line receiver 26 is at levels of 0 and +5V. The primary purpose of line receiver 26 is to convert from the RS 232 levels to TTL levels, and the line receiver is wired for a fail-safe operation. Such fail-safe wiring means that if the input is removed by not having a terminal plugged in or by having a break in the cable, the output will remain in an "off" condition.

The output signal from the line receiver 26 will energize the T1 terminal's LED 28 connected by means of resistor 29 to conductor 31, connected in turn to the input of an inverter 32 (N7404). The output of inverter 32 supplies the positive going signal through conductor 33 to a timer 34 (556) and this positive going signal allows the timer to begin its operation. The timer 34 is connected to a source of positive voltage by means of resistor 36 and to ground through capacitor 37. Resistor 36 and capacitor 37 determine the time constant of timer 34. The positive going ouput signal from the timer 34 is fed to a NOR gate 38 (SN7425) through conductor 39. Timers 34 for terminals T2–T4 are similarly connected to the NOR gate 38 through conductors 41, 42, 43, and all of the conductors 39, 41–43 are connected to AND gates 46–49 (N7408) of the transmitted data circuits associated with the transmitted data leads at each of the associated terminals T1–T4 as will be described hereinafter.

The output of the NOR gate 38 turns on an RTS LED 51 connected by means of resistor 52 to conductor 53 connected to the input of output driver 54 (SN75150) for converting the TTL logic levels back to RS 232 logic levels. This signal is then fed through conductor 56 to the modem's RTS lead, the conductor 56 being connected to ground through a capacitor 57. Capacitor 57 sets the slew rate.

When the modem 13 is ready to accept data from a remote terminal such as terminal T1, it will raise the CTS lead, and this signal is fed through a line receiver 58 (SN75154) by means of conductor 59 connected to the input of line receiver 58. The output of the line receiver 58 produces a signal on conductor 61 connected to turn on a CTS LED 62. LED 62 is connected to a source of positive voltage and to a conductor 61 and resistor 63. An output driver 64 (SN75150) has its input connected to conductor 61 for receiving the signal from line receiver 58 but the output driver 64 is this CTS circuit is used only to hold the terminal's CTS lead in an off (−) condition. The output of line driver 64 is connected by means of conductor 66 to the CTS leads in each of the terminals T1-T4 through respective diodes 67.

When the modem's CTS lead comes on, the requesting terminal's CTS lead will be turned on from its own RTS lead and the inactive terminal's CTS leads will be held off by their RTS leads. This action is really an AND circuit. If the CTS and RTS are both on, the terminal's CTS lead will be "on". The diode 67 in the output of the line driver 64 will conduct only if the modem's CTS is off.

If the terminal's RTS lead, for any reason, tries to stay on longer than a preset limit, (usually 30 seconds) as set by resistor 36 and capacitor 37, the time-out circuit of timer 34 will turn off, which will turn off the transmitted data circuit associated with this particular terminal. This action will also drop the RTS signal going to the modem. The terminal's LED 28 remains on, but the RTS LED 51 will turn off. At this time, the other terminals (T2-T4) connected to the modem sharer 15 can request and receive service. These other terminal's LEDs and RTS LEDs will blink off and on, as service is requested, but the offending terminal's LED will remain steadly on because it is hung-up. After normal transmission, the input to timer 34 returns to OV, and timer 34 is therefore reset.

After the RTS and CTS sequence as described above has occurred, terminal T1 will begin to transmit data. Normally, the TX lead should be held in a "Mark Hold" (−) condition. However, in the circuit of the invention, it is immaterial if the lead is in a "Mark Hold" or "Space Hold" (+) condition. The transmitted data lead of terminal T1 is connected by means of conductor 71 to the input of a line receiver 72 (SN75154), the output of which is connected by means of conductor 73 to an inverter amplifier 74 (N7404) for inverting the signal which is fed to the input of the AND gate 46 (N7408) by means of conductor 76.

The AND gate 46 "AND's" the output of a timer 34 and the transmitted signal from the transmitted data lead from terminal T1. The output of the AND gate 46 is fed to a NOR gate 77 (7425) through conductor 78. The NOR gate 77 receives input signals from each of the AND gates 47-49 through conductors 81-83 associated with the transmitted data leads of terminals T2-T4, respectively. The output of the NOR gate 77 is fed through conductor 86 to a line driver 87 (SN75150), the transmit LED being connected to a positive voltage and to conductor 86 and resistor 89. The output of the line driver 87 is connected by means of conductor 91 to the transmit data lead of the modem 13, conductor 91 also being connected to ground by means of capacitor 92 which sets the slew rate.

The circuit of the invention also includes a short-proof regenerating amplifier which, as shown in FIG. 3C, includes a line receiver 108 (SN75154) and line driver 107 (SN75150) associated with the RX, RC, and TC leads in the modem, and connected to the RX, RC and TC leads in each of the terminals T1-T4, respectively. More specifically, in the RX short-proof regenerating amplifier associated with the TX leads, the RX lead in each of the terminals T1-T4 is connected to one side of a resistor 101-104, respectively, the other side of which is connected in common and by a conductor 106 to the output of line driver 107. The line receiver 108 is also provided, having its input connected to the RX lead on modem 13 through conductor 109, and its output through conductor 111 to the input of the line driver 107. The output signal from the line receiver 108 also energizes the RX LED 112 connected by means of resistor 113 to conductor 111 and on its other side to a source of positive voltage.

In operation, the RX, RC, and TC signals are all fed through the line receiver 108 and line driver 107 for regenerating (amplifying and reshaping) these signals. This is essential if a plurality of modem sharers 15 are piggybacked to extend the number of terminals that are in service. The resistors 101-104 in the output of the line driver 107 short-circuit protect these leads, and if the terminal of another modem sharer associated with the output leads loads down or shorts the lead, the whole system is not dragged down but will continue to operate as normal. The short proof generating amplifier circuits for the RC and TC signals, as shown in FIG. 3C, are of the same configuration as described above when reference was made to the RX regenerating amplifier circuit. Like numbers are therefore used to identify like parts.

Figure 4:
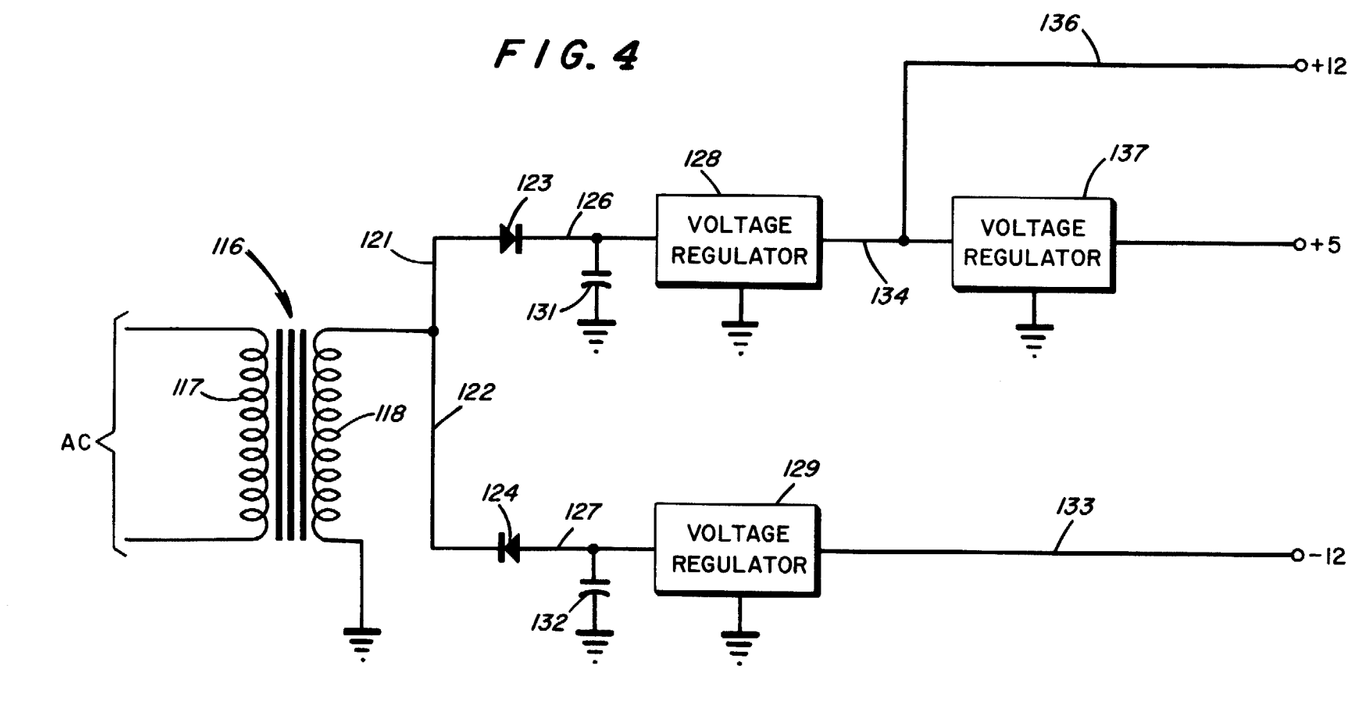
FIG. 4 is a schematic wiring diagram of the regulated power supply circuit of the invention.

Finally, the modem sharer of the invention includes a regulated power supply as shown in FIG. 4, having a step-down transformer 116, the primary winding 117 of which is arranged to be connected to a conventional source of AC power. The grounded secondary winding 118 of transformer 116 is connected to conductors 121, 122 connected to oppositely facing diodes 123, 124 respectively, the other sides of which are connected by means of conductors 126, 127 to grounded voltage regulators 128, 129, respectively. Conductors 126, 127 are filtered to ground by capacitors 131, 132, respectively. The output of voltage regulator 129 provides a power supply voltage of −12V on conductor 133; the output of voltage regulator 128 on conductor 134 is connected to conductor 136 to provide a +12V power supply and to the input of voltage regulator 137, the output of which provides a power supply voltage of +5V.

It should be appreciated that while the foregoing description and drawings refer to a modem sharer associating with four remote terminals, more or less terminals can be used. In addition, while not specifically illustrated, it whould be noted that a plurality of modem sharers can be connected in tandem to expand the capability of the associated transmission network. In this latter regard, the output of a modem sharer would form one of the inputs to a next successive modem sharer, the output of which is, in turn, connected to a modem.

Above, a specific embodiment of the present invention has been described. It should be appreciated that this description was given for purposes of illustration only, and was in no way intended to limit the spirit or scope of the invention. Rather, it is the intent that the present invention be limited only as defined in the appended claims.

What is claimed is:

1. A modem sharer for connecting a plurality of remote terminals to a modem in a polled teleprocessing network, the modem sharer comprising: a plurality of request to send inputs for receiving signals from respective terminals when ready to transmit information; a plurality of transmitted data inputs for receiving the data to be transmitted from the respective terminals; request to send output means for associating with said modem and for transmitting a signal to said modem when a terminal provides an input signal to a request to send input; a transmitted data output for transmitting data from each of said terminals to said modem; a clear to send input for receiving a signal from said modem indicating that said modem is ready to send data, and for enabling the transmission of data from a terminal to said modem from a transmitted data input to a transmitted data output; and timer means for disenabling the transmission of data from a terminal to said modem after a predetermined time from the initiation of a signal on a request to send input.

2. The modem sharer as recited in claim 1, wherein said timer means enables a transmission path between a terminal and said modem.

3. The modem sharer as recited in claim 2, wherein said transmission path is completed immediately upon the issuance of a request to send signal, and is interrupted after the elapse of a predetermined time period.

4. The modem sharer as recited in claim 2, wherein upon the elapse of a predetermined time period, said timer means blocks the transmission of request to send signals from a remote terminal.

5. The modem sharer recited in claim 1, and further comprising gate means for receiving request to send signals from each of said remote terminals and for receiving clear to send signals from said modem, and for enabling the transmission of data from the selected terminal to said modem only upon the simultaneous receipt of such request to send and clear to send signals.

6. The modem sharer recited in claim 5, wherein said gate means is an AND gate, the output of which defines a clear to send output of the modem sharer.

7. The modem sharer as recited in claim 1, wherein said timer means includes an independent timer associated with each of said remote terminals.

8. The modem sharer recited in claim 7, wherein the outputs of each timer are fed to output gate means.

9. The modem sharer recited in claim 8, wherein said output gate means transmits a request to send signal to said modem upon receiving an input from any of said terminals.

10. The modem sharer recited in claim 1, and further comprising regenerating amplifier means connected in the data path of transmission from the modem to each of said remote terminals.

11. The modem sharer recited in claim 10, and further comprising an isolating resistor means between said regenerating amplifier means and each of said remote terminals.

12. The modem sharer recited in claim 1, and further comprising indicator means for monitoring the status of said teleprocessing network.

13. The modem sharer recited in claim 12, wherein said indicator means comprises a plurality of discrete indicators for indicating when each of said remote terminals desires to send data, and for indicating when any of said remote terminals exceeds said predetermined time period without completing to next transmission.

* * * * *